United States Patent
Bogner et al.

(10) Patent No.: US 8,473,731 B2
(45) Date of Patent: Jun. 25, 2013

(54) SYSTEM AND METHOD FOR PHYSICAL TO VIRTUAL DISK RE-LAYOUT

(75) Inventors: Etay Bogner, Zippori (IL); Yoav Weiss, Petach Tikva (IL)

(73) Assignee: Intel Corporation, Santa Clara, CA (US)

( * ) Notice: Subject to any disclaimer, the term of this patent is extended or adjusted under 35 U.S.C. 154(b) by 257 days.

(21) Appl. No.: 12/963,225

(22) Filed: Dec. 8, 2010

(65) Prior Publication Data

US 2011/0138165 A1 Jun. 9, 2011

Related U.S. Application Data

(60) Provisional application No. 61/267,454, filed on Dec. 8, 2009, provisional application No. 61/267,455, filed on Dec. 8, 2009.

(51) Int. Cl.
*G06F 9/00* (2006.01)
*G06F 15/177* (2006.01)
*G06F 9/455* (2006.01)

(52) U.S. Cl.
USPC .......... 713/2; 713/1; 709/222; 718/1

(58) Field of Classification Search
USPC .................. 713/1, 2; 709/222; 718/1
See application file for complete search history.

(56) References Cited

U.S. PATENT DOCUMENTS

| | | | |
|---|---|---|---|
| 7,865,893 B1 * | 1/2011 | Omelyanchuk et al. | 718/1 |
| 8,127,292 B1 * | 2/2012 | Dobrovolskiy et al. | 718/1 |
| 8,166,477 B1 * | 4/2012 | Tormasov | 718/1 |
| 8,205,197 B2 * | 6/2012 | Challener et al. | 718/1 |

* cited by examiner

*Primary Examiner* — Stefan Stoynov
(74) *Attorney, Agent, or Firm* — Blakely, Sokoloff, Taylor & Zafman LLP

(57) ABSTRACT

A method and device may, in a computing system executing a operating system and having a mass storage device, rewrite the boot sector of the operating system on the storage device to execute a hypervisor operating system in a boot process, copy a file including the hypervisor kernel to a first sub-area on the storage device, copy software components of the hypervisor to a second sub-area on the storage device, boot to execute the hypervisor as an operating system, execute the operating system, retrieve information indicative of absolute mapping of sectors used by the operating system on the storage device, allocate for the sectors on a third sub-area of the mass storage device, perform a second boot to run the hypervisor as a host operating system, and execute the operating system as guest operating system.

20 Claims, 4 Drawing Sheets

SYSTEM AND METHOD FOR PHYSICAL TO VIRTUAL DISK RE-LAYOUT

CROSS REFERENCE TO RELATED APPLICATIONS

This application claims the priority of U.S. Provisional application No. 61/267,454, filed on Dec. 8, 2009 (and entitled TRANSPARENT PHYSICAL-TO-VIRTUAL DISK RE-LAYOUT), and of U.S. Provisional application No. 61/267,455, filed on Dec. 8, 2009 (and entitled TRANSPARENT PHYSICAL-TO-VIRTUAL DISK RE-LAYOUT) which are incorporated in their entirety herein by reference.

BACKGROUND OF THE INVENTION

In the computing field some computing systems require enabling the running of several virtual machines (VMs) on a single physical machine. A VM may be, for example, a software implementation of a computing machine (e.g. a computer) that executes instructions like a physical machine. In order to enable the execution of several VMs on a single hardware machine one or more virtual mass-storage devices may be allocated for at least some of the VMs. For example for each such VM, a local hard disk or a network based storage solution may be emulated that uses a portion of the storage capacity of the mass-storage device and looks for its respective VM as a solely owned and operated storage device.

Virtualization solutions may include for example three elements: a hypervisor, a "Device Model" and VMs. A hypervisor is a term commonly used to define techniques and software components which allow multiple operating systems, sometimes termed 'guests', to run concurrently on a single computer, usually termed 'host computer'. Two virtualization software architectures are well known in the field of computing, commonly referred to as Type 1 architecture and Type 2 architecture. In the Type 1 software architecture, also termed a 'bare-metal' or 'native' hypervisor, the hypervisor is a software component that runs directly on the host computer hardware to control the hardware and to monitor guest operating systems (OSs), by interacting directly with the underlying hardware. In Type 2 architecture one of the VMs is assigned to be the host OS. The host OS may interact with the underlying hardware and the hypervisor is in fact a process running within the context of the host OS and itself hosting one or more guest OSs.

When a virtualization solution is activated specific VMs may be defined. One may be a Mastering Virtual Machine (MVM) which is the VM that is responsible for various hardware activities, such as accessing network(s), etc. Other hosted VMs will, according to such configuration, access these networks (and other mastered resources) via the control of MVM. The MVM may take various forms and configurations in different setups and technologies, such as a headless OS (an OS which does not require any input from or output to a user) or a "full blown" OS (such as Microsoft Windows). The other roles a specific VM may assume may be for example a primary VM (PVM), which is the VM residing and running on the computer before a hypervisor is installed and an additional VM (AVM), a VM without any special traits or features with regard to the hypervisor operating system and/or the computer. Those roles are not mutually exclusive. The term "Device Model" is used herein to define a configuration, or set of defining values of configuration parameters, that define the respective parameters for each hosted VM.

Type 1 virtualization solutions involve several disadvantages subject to the method of installation of the hypervisor operating system. When the installation involves first erasure of the entire hard disk and then installation of the hypervisor from scratch it is destructive and erases any existing OS installations. Accordingly, it prevents this approach from being used in non-enterprise class and/or outside-of-the-enterprise-perimeter solutions and it requires professional information technology (IT) personal to handle the installation. When the installation involves repartitioning an existing hard-disk for allocating disk space for the virtualization solution (e.g. hypervisor) it causes users of the hard disk to notice a change in the hard disk actual size, it raises technical problems related to disk repartitioning, it raises OS re-activation issues (for example, once the Windows® OS detects such changes, it sometimes requires the end-user to "reactivate" the Windows® license), it raises "uninstall" problems and is difficult to implement on hard disk that is encrypted.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
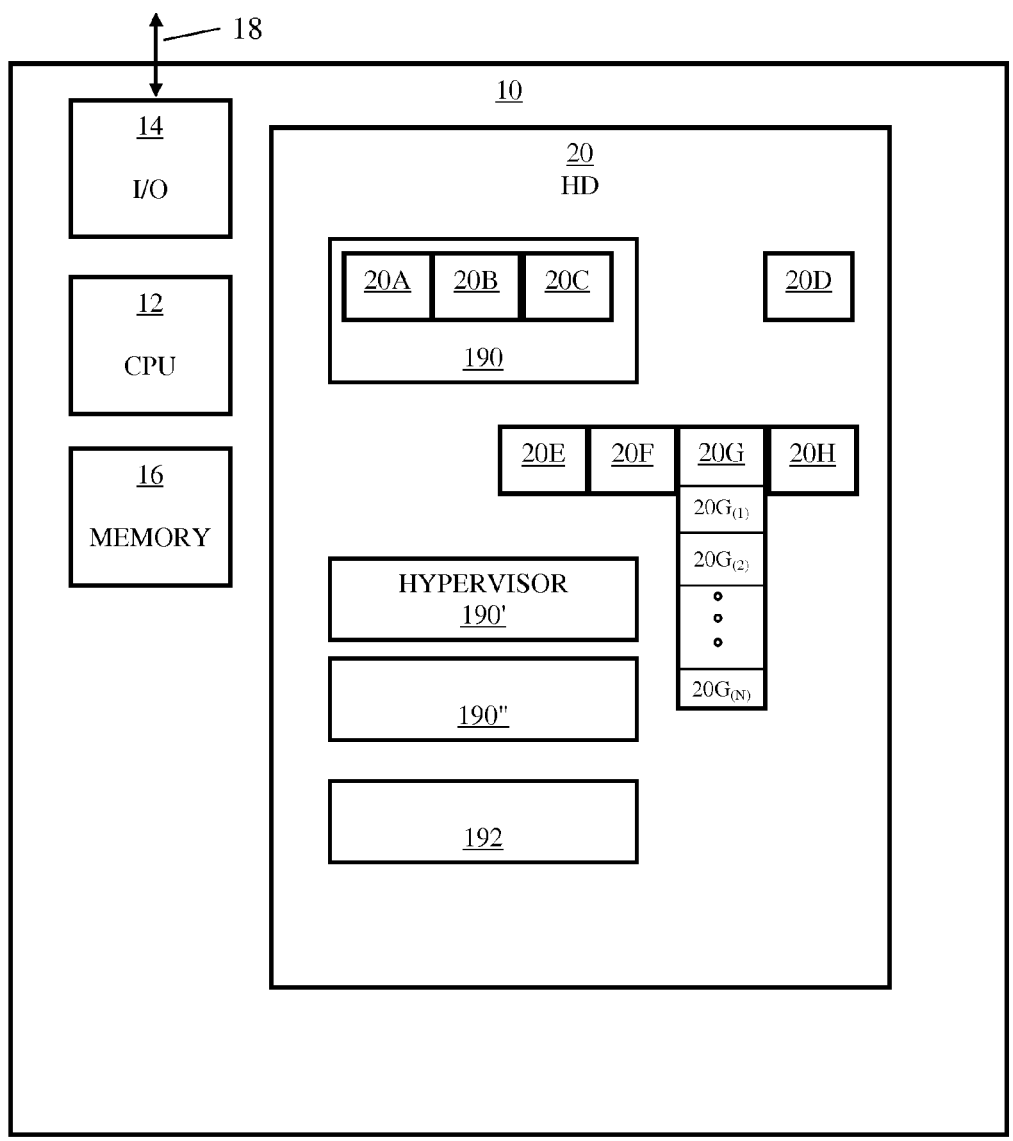
FIGS. 1 and 1A are schematic illustrations of computing systems according to embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those of ordinary skill in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatus for performing the operation herein. This apparatus may be specially constructed for the desired purposes, or it may comprise a general-purpose computer selectively activated or reconfigured by a computer program stored in the computer. Such a computer program may be stored in a computer readable storage medium, such as, but not limited to, any type of disk, including floppy disks, optical disks, magnetic-optical disks, read-only memories (ROM's), compact disc read-only memories (CD-ROM's), random access memories (RAM's), electrically programmable read-only memories (EPROM's), electrically erasable and programmable read only memories (EEPROM's), FLASH memory, magnetic or optical cards, or any other type of media suitable for storing electronic instructions and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform a desired method. A desired structure for a variety of these systems will appear from the description below. In addition, embodiments of the present invention are not described with reference to any particular programming language. It will be appreciated that a variety of programming languages may be used to implement the teachings of embodiments of the invention as described herein.

It should be appreciated that according to some embodiments of the present invention, the method described herein may be implemented in machine-executable instructions. These instructions may be used to cause a general-purpose or special-purpose processor that is programmed with the instructions to perform the operations described. Alternatively, the operations may be performed by specific hardware that may contain hardwired logic for performing the operations, or by any combination of programmed computer components and custom hardware components.

Embodiments of the invention may be provided as a computer program product that may include a machine-readable medium or a computer or processor readable medium such as for example a memory, a disk drive, or a USB flash memory, encoding, including or storing instructions, e.g., computer-executable instructions, which when executed by a processor or controller, perform the methods disclosed herein. For the purposes of this specification, the terms "machine-readable medium" may include any medium that is capable of storing or encoding a sequence of instructions for execution by the machine and that cause the machine to perform any one of the methodologies of the present invention. The term "machine-readable medium" may accordingly include, but is not limited to, solid-state memories, and optical and magnetic disks.

Although the scope of the present invention is not limited in this respect, the system and method disclosed herein may be implemented in many wireless, handheld and portable communication devices. By way of example, wireless, handheld and portable communication devices may include wireless and cellular telephones, smart telephones, personal digital assistants (PDAs), web-tablets and any device that may provide wireless access to a network such, an intranet or the Internet. Embodiments of the present invention may be used in devices such as personal computers, laptop computers, workstations, etc. It should be understood that the present invention may be used in a variety of applications.

The present invention addresses problems associated with known methods for disk re-layout and provides for a transparent solution that allows installing a type 1, bare-metal, hypervisor on any hardware platform. Other benefits may be achieved, and other types of OSs or hypvervisors may be installed using embodiments of the present invention.

According to embodiments of the present invention an alternative solution (as commonly used by Type 2 virtualization solutions) may include using an existing disk/volume layout. File(s) on the original disk volume may be allocated which belong to the PVM. The ability to isolate the VM file system from the virtualization system may be prevented, which may hurt the system's stability due to corruption of all other file systems of VMs, disabling the virtualization solution. Additionally prior art installation methods may hurt the system's security because a PVM has a full access to other VM file systems and the PVM has a full access to hypervisor file system. Still further in such installation methods basic features, such as disk snapshots, may not be available and the solution cannot run on machines with encrypted disks. The term 'disk snapshot' herein refers to an operation enabling to record and save data item indicative of the state of the disk at a particular point in time, for example the form and content of the disk file system, the most updated version of files on the disk, data indicative of changes made in files since last time these files were saved to the disk, etc.

Reference is now made to FIG. 1, which is a schematic illustration of a computing system according to embodiments of the present invention. Computing system 10 may include one or more central processing units or controllers (CPUs) 12, input/output (I/O) unit 14, memory (e.g. random access memory (RAM)) unit 16, one or more communication channels 18 and a mass storage device 20. Storage area 190 in mass storage device 20 may be used for storing software components of primary OS essential for booting primary OS. Storage area 190' in mass storage device 20 may be used for storing software components of hypervisor operating system. Storage area 190" in mass storage device 20 may optionally be used for storing software components of additional OSs. CPU 12 may be configured to load and execute instructions and data from memory unit 16, from mass storage device 20 and/or from communication channels 18 via I/O unit 14, or from other locations. Memory unit 16 may be a RAM, a static RAM (SRAM), a dynamic RAM (DRAM), a Flash type memory and the like, or other types of memory. I/O unit 14 may include an I/O interface module supporting interface to one or more I/O channels 18, such as display channel, keyboard channel, mouse channel, universal serial bus (USB) channel, Internet channel and the like. Computing system 10 may execute or may be operable according to the primary OS.

Mass storage device 20 may be a hard disk or hard drive having a magnetic or optical medium, a static memory mass storage device and the like. The storage volume of mass storage device 20 may initially be partitioned to accommodate a primarily installed OS, referred to herein as a primary VM. The volume of mass storage device 20 may include, within storage area 190, essential software components for booting and executing a certain type of OS. By way of example, for primary OS of one type storage area 190 may include boot sector content in a first sub-area 20A, boot loader in a second sub-area 20B and file system (FS) information in a third sub-area 20C, such as file allocation table (FAT) of Windows® or ext3 of Linux. However, it would be apparent to one skilled in the art that for different type of OS, for example a second type OS, different essential software components may be stored in storage area 190, ensuring that the second type OS will boot and be executed in the next-to-come boot process. Additionally mass storage device 20 may include one or more partitions for saving files in fourth sub-area 20D. It will be appreciated that for different VMs different sets of storage areas on mass storage device 20 may be required for ensuring proper boot and execution of the hypervisor operating system and keeping of file system essential information.

Figure 1A:
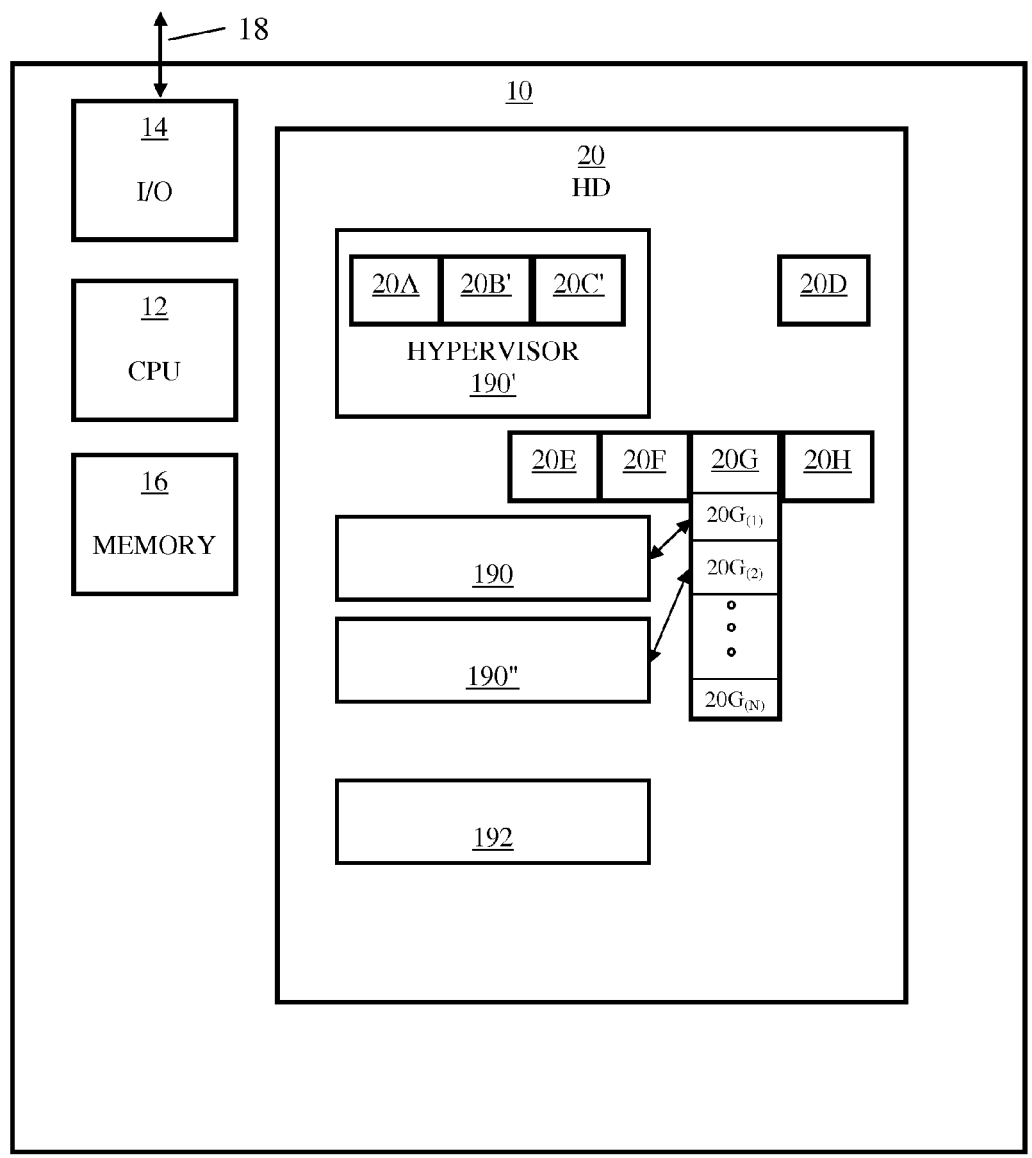
Figure 2:
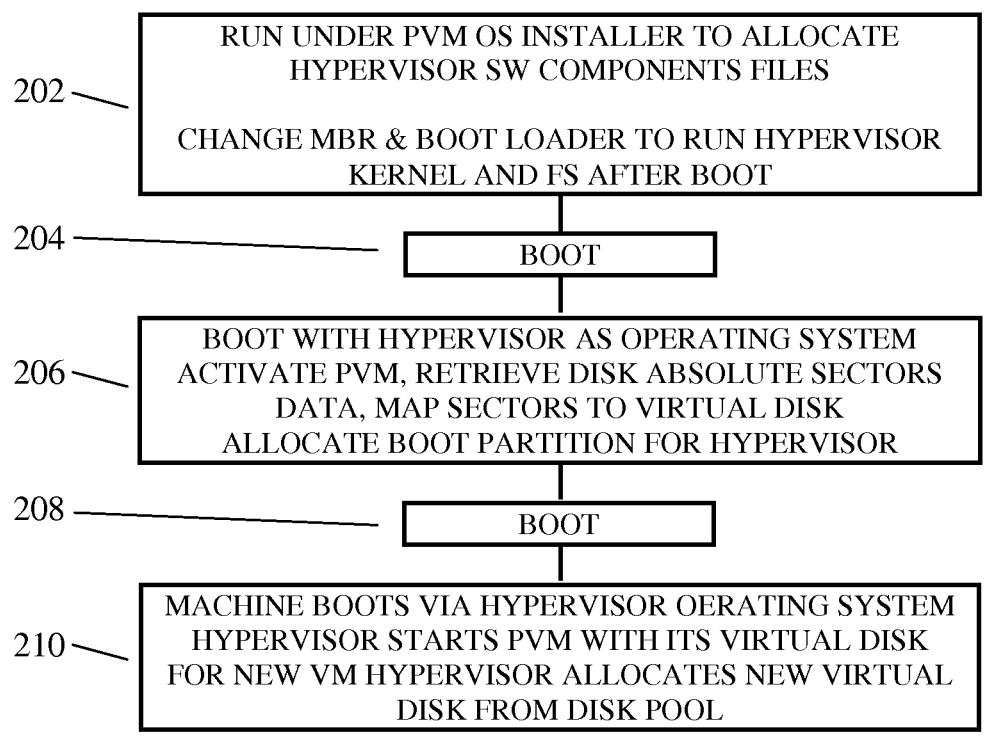
FIG. 2 is a flow diagram depicting a method for physical to virtual disk re-layout according to embodiments of the present invention.

Reference is made now also to FIG. 1A, which is a schematic illustration of a computing system and to FIG. 2, which is a flow diagram depicting a method for physical to virtual disk re-layout, according to embodiments of the present invention. Installation of a hypervisor on a computer executing or running under the control of a certain OS (herein termed a primary OS), such as computer system 10 (FIG. 1) may be performed in sections or phases. In a first phase an installer or installation program stored in area 192 on mass storage device 20 may be loaded and run or executed by computing system 10 executing or running as a process in a PVM (also denoted hereinafter primary OS). During the execution, which may be controlled and carried out by the primary OS, the content of boot sector sub-area 20A and boot loader sub-area 20B may be rewritten so as to contain data of a boot sector and boot loader of hypervisor operating system, currently stored in storage area 190'. This will cause during the next-to-come boot process loading and execution or running a hypervisor operating system (or program) stored in area 190' which will function as the 'host' OS. As may be seen in FIG. 1A, which differs from FIG. 1 only in that storage sub-areas 20A, 20B and 20C contain software components of primary OS in FIG. 1, and contain software components of hypervisor operating system in FIG. 1A. Additionally, the file including the hypervisor operating system software components, the file including the kernel program of the hypervisor operating system, the file including the initial hypervisor file system required for the initial boot which are stored in storage volume 190', and a file holding a copy of parts of the file system of the primary OS may be allocated to sub-areas 20D, 20E and 20F, respectively, as well as file sub-area 20G allocating additional free area on the disk for the hypervisor to use as a pool of disk blocks for adding hosted VMs (block 202). At this stage the executing or running VM may save the required data in a proper format to enable or permit an un-installation of the hypervisor at later stages, optionally using sub-area 20F. When this phase is completed the primary OS may reboot (block 204).

Upon a first boot after the hypervisor software components were saved on the mass storage device 20 (e.g., a reboot), the hypervisor program loads and executes or runs as a mastering OS and it may start or execute the primary OS as a background process, retrieve (if required, from primary OS) information on or indicative of absolute mapping of used and unused disk sectors and allocate for these mapped sectors respective areas in a sub-area or sub-section inside disks pool file sub-area 20G, which is a sub area to be used as a virtual disk for another OS running under a hypervisor (block 206). It will be noted that retrieval of information on or indicative of absolute mapping of the disk sectors may need to be performed via primary OS only in cases when the disk is encrypted prior to the installation of hypervisor operating system. When the disk is not encrypted the hypervisor operating system may directly retrieve this information by directly reading/writing from/to the disk. In order to enable proper operation of the primary OS as a guest OS under the control of a hypervisor operating system the location of the sector where the content of the boot sector of primary OS will be saved may be stored or kept by the hypervisor program on mass storage device 20 and its value may be matched by the hypervisor operating system when the primary OS is activated as a guest OS to imitate 'sector zero' address for primary OS and thus allow the primary OS to read its content when starting the boot process as if nothing changed for the primary OS in terms of the address. Each guest OS that is activated under the control of the hypervisor operating system may be considered a VM and it may use sectors allocated as free space of the primary OS.

The storage area on disks pool sub-area 20G that is allocated to a certain $VM_{(x)}$ to serve as a virtual hard disk (x) may be denoted $VHD_{(x)}$ and it may occupy disk area $20G_{(x)}$, e.g. $20G_{(1)}, 20G_{(2)} \ldots 20G_{(N)}$.

When this phase ends the hypervisor (or computing system 10) may reboot (block 208).

Upon the second boot computing system 10 starts with the hypervisor operating system as its mastering OS and it starts the primary OS that executes or runs as a VM executing or running under the hypervisor operating system with the virtual disk $VHD_{(PVM)}$ operating as its hard disk (block 210). Additional VMs may be started by the hypervisor as well.

It will be noted that when more than one VM runs or executes under the hypervisor one of the running VMs may be defined, according to embodiments of the present invention, as a Master VM (MVM), for example in order to control and manage access to and use of certain computer resources by other VMs, such as communication channels (wire or wireless access to communication networks, etc.).

According to embodiments of the present invention each VM that is activated under the control of a hypervisor operating system may be confined to access data that is saved or stored within the area allocated to its respective virtual hard disk. It will further be noted that for the installation and activation of an additional one or more guest VMs, the hypervisor may allocate a respective virtual disk $VHD_{(x)}$ for the additional VM, allowing its installation onto that $VHD_{(x)}$, and activating it under the control of the hypervisor operating system, similarly to the activation of the primary OS.

It will be noted that the process described above for installing a hypervisor operating system software components on a disk primarily configured to serve as a disk associated with a primary OS and for making that hypervisor operating system the controlling OS may not, in some embodiments, involve erasure or formatting of the hard disk, and in some embodiments may not require any specific knowledge in computer handling.

When the mass storage device of the computing system, such as mass storage device 20 of computer system 10 is encrypted prior to the installation of a hypervisor operating system additional steps may be taken to enable installation of the software components of the hypervisor OS and smooth transfer of the control of the computing system from the primary OS to the hypervisor operating system. Installation of the software components of the hypervisor OS as described above with regards to FIG. 2 may not be feasible because after the first boot process the hypervisor operating system may not be able to boot and start since the decrypting 'key' for the encrypted disk (e.g., any decryption solution that is used by the primary OS to enable access to the disk) is not available to the booting hypervisor operating system.

Figure 3:
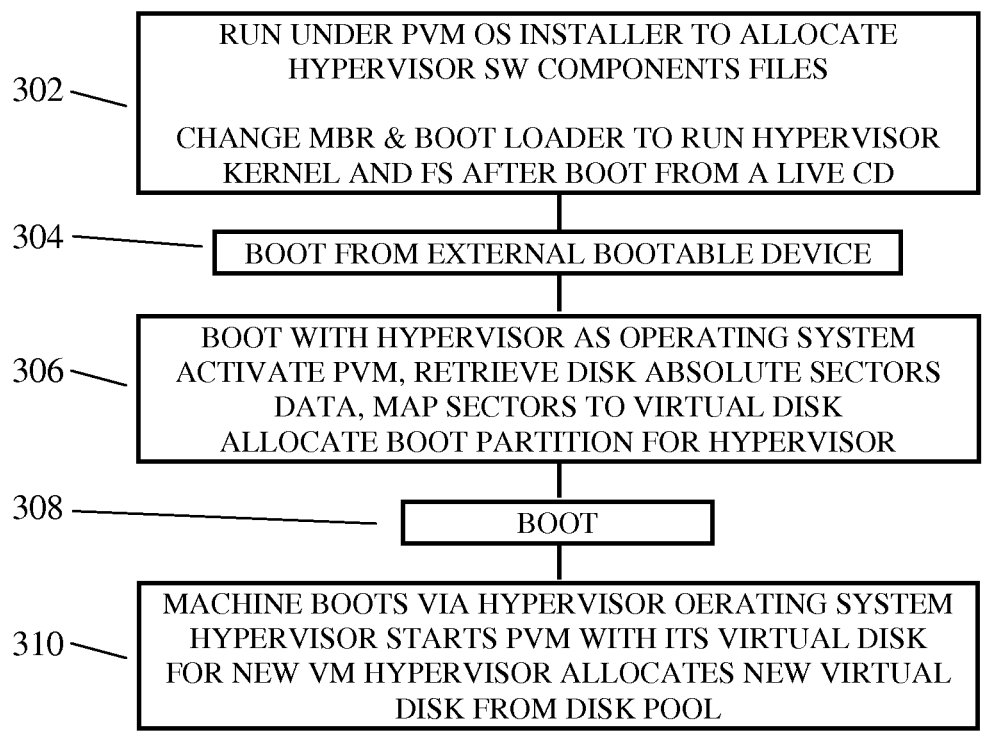
FIG. 3 is a flow diagram depicting a method for physical to virtual disk re-layout according to embodiments of the present invention.

Reference is made now to FIG. 3, which is a flow diagram depicting a method for physical to virtual disk re-layout according to embodiments of the present invention. The operations depicted in blocks 302, 306, 308 and 310 of FIG. 3 are substantially identical to operations depicted in blocks 202, 206, 208 and 210 of FIG. 2. One main difference is that operation 304, a first boot, is performed either manually by a human or automatically from an external bootable or bootable device. In addition, in block 302 the optional operation of changing the values of the MBR and the boot loader address is done so that in the next boot the computing machine will automatically boot from the external device. Such an external device may be a bootable CD/DVD (also denoted Live CD/DVD) or a floppy disk, or another suitable device. Boot from the network may also be performed, such as pre-boot execution environment (PXE) boot. Once in the first boot the computing machine runs under the control of a hypervisor OS, which was loaded from the external device. The remaining operations of the physical to virtual re-layout of the disk, such as mass storage device 20 (FIG. 1), e.g. operations 306, 308 and 310, may be performed similarly to their respective operations 206, 208 and 210 of FIG. 2, and the explanations made above with respect to these operations are applicable also with respect to operations 306, 308 and 310. Once the computing machine runs under the control of hypervisor operating system, the hypervisor may communicate with an agent executing in primary OS in order to retrieve location of physical blocks of files and free space by allocating empty files so that the hypervisor operating system will later re-allocate onto other locations on the mass storage device from below the encrypting engine which is runs under the primary VM.

It will be noted that according to embodiments of the present invention the methods described above may be implemented with any type of primary OS, such as the Microsoft Windows® OS, the Apple MacOS® OS, the Linux OS, etc. Mass storage devices that are subject to physical to virtual re-layout according to embodiments of the present invention may preserve the option to take virtual disk snapshots, maintain the ability to perform the first boot process from an external boot or bootable device, maintain full isolation of boot sector content and FS between the various VMs and enable installation and effecting of disk re-layout solutions according to embodiments of the present invention when the mass storage device under the primary OS is encrypted, without removing the encryption and without formatting the mass storage device. It will also be noted that according to embodiments of the present invention the hypervisor operating system may allocate dynamic size for the one or more virtual disks based, for example, on the actual free area on mass storage device 20 and further based on other parameters.

Although the scope of the present invention is not limited in this respect, the wireless communications technologies may include radio frequency (RF) and infrared. Non-limiting examples of RF wireless standards are protocols, such as, for example, Bluetooth, IEEE-Std 802.11a, IEEE-Std 802.11b, 1999 edition, IEEE-Std 802.11g and HomeRF. Non-limiting examples of infrared light signals are protocols, such as, for example, InfraRed Data Association (IrDA) standard.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are may be changed, and particular operations are illustrated in the context of specific illustrative configurations. Other allocations of functionality are envisioned and may fall within the scope of claims that follow. Finally, structures and functionality presented as discrete components in the various configurations may be implemented as a combined structure or component. These and other variations, modifications, additions, and improvements may fall within the scope of the invention as defined in the claims that follow.

The invention claimed is:

1. A method comprising, in a computing system executing a first operating system and having a mass storage device:
rewriting the boot sector of said first operating system on said mass storage device to execute a hypervisor operating system in a boot process;
copying a file comprising the kernel of said hypervisor operating system to a first sub-area on said mass storage device;
copying a file comprising software components of said hypervisor operating system to a second sub-area on said mass storage device;
performing a first boot process to execute said hypervisor as an operating system;
executing said first operating system as a background process of said hypervisor operating system;
retrieving from said first operating system information indicative of absolute mapping of sectors used by said first operating system on said mass storage device;
allocating for said sectors used by said first operating system respective storage areas on a third sub-area of said mass storage device to be used as a first virtual hard disk by said first operating system;
performing a second boot process to run said hypervisor as a host operating system; and
executing said first operating system as first guest operating system hosted by said hypervisor operating system.

2. The method of claim 1, comprising, for a second guest operating system:
said hypervisor operating system allocating a second virtual disk;
said hypervisor operating system installing software components of said second guest operating system; and
said hypervisor operating system activating said second guest operating system as a process using said second virtual disk as its system disk.

3. The method of claim 2, wherein said first guest operating system is isolated from said second virtual disk and said second guest operating system is isolated from said first virtual disk.

4. The method of claim 1, comprising before the performing of said first boot process, saving data relating to said first operating system to enable uninstall operation at later stages.

5. The method of claim 1 further comprising:
enabling the taking of a virtual disk snapshot.

6. The method of claim 1 wherein performing of said first boot process is performed from an external boot device.

7. The method of claim 1 further comprising:
enabling taking virtual disk snapshot.

8. A method comprising, in a computing system operable by a first operating system and having an encrypted mass storage device:
rewriting the boot sector of said first operating system on said mass storage device to execute a hypervisor operating system in a boot process;
copying a file comprising the kernel of said hypervisor operating system to a first sub-area on said mass storage device;
copying a file comprising software components of said hypervisor operating system to a second sub-area on said mass storage device;
performing a first boot process from an external boot device to run said hypervisor as operating system;
retrieving from said first operating system information indicative of absolute mapping of sectors used by said first operating system on said mass storage device;
allocating for said sectors used by said first operating system respective storage areas on a third sub-area of said mass storage device to be used as a first virtual hard disk by said first operating system;

performing a second boot process execute said hypervisor as a host operating system; and executing said first operating system as first guest operating system hosted by said hypervisor operating system.

9. The method of claim 8, comprising, for a second guest operating system:

said hypervisor operating system allocating a second virtual disk;

said hypervisor operating system installing software components of said second guest operating system; and said hypervisor operating system activating said second guest operating system as a process using said second virtual disk as its system disk.

10. The method of claim 9, wherein said first guest operating system is isolated from said second virtual disk and said second guest operating system is isolated from said first virtual disk.

11. The method of claim 8, comprising before the performing of said first boot process, saving data relating to said first operating system to enable uninstall operation at later stages.

12. A computing system comprising:

at least one central processing unit;

a memory unit; and a mass storage device having stored thereon a first operating system; and said central processing unit to:

rewrite the boot sector of a first operating system on said mass storage device to execute a hypervisor operating system in a boot process;

copy a file comprising the kernel of said hypervisor operating system to a first sub-area on said mass storage device;

copy a file comprising software components of said hypervisor operating system to a second sub-area on said mass storage device;

perform a first boot process to execute said hypervisor as an operating system;

execute said first operating system as a background process of said hypervisor operating system;

retrieve from said first operating system information indicative of absolute mapping of sectors used by said first operating system on said mass storage device;

allocate for said sectors used by said first operating system respective storage areas on a third sub-area of said mass storage device to be used as a first virtual hard disk by said first operating system;

perform a second boot process to run said hypervisor as a host operating system; and execute said first operating system as guest operating system hosted by said hypervisor operating system.

13. The computing system of claim 12, wherein said central processing unit is to:

allocate a second virtual disk;

install software components of a second guest operating system; and activate said second guest operating system as a process using said second virtual disk as its system disk.

14. The computing system of claim 13 wherein said first guest operating system is isolated from said second virtual disk and said second guest operating system is isolated from said first virtual disk.

15. The computing system of claim 12, wherein said central processing unit is to save data relating to said first operating system to enable an uninstall operation at later stages before performing said first boot process.

16. The computing system of claim 12, wherein said central processing unit is to enable the taking of a virtual disk snapshot.

17. The computing system of claim 12, wherein said central processing unit is to perform said first boot process from an external boot device.

18. An article of manufacture tangibly embodying a computer-readable storage medium having stored thereon a set of instructions that when executed by a processor cause a computer executing a first operating system to perform a process comprising:

rewriting the boot sector of said first operating system on a mass storage device to execute a hypervisor operating system in a boot process;

copying a file comprising the kernel of said hypervisor operating system to a first sub-area on said mass storage device;

copying a file comprising software components of said hypervisor operating system to a second sub-area on said mass storage device;

performing a first boot process to execute said hypervisor as an operating system;

executing said first operating system as a background process of said hypervisor operating system;

retrieving from said first operating system information indicative of absolute mapping of sectors used by said first operating system on said mass storage device;

allocating for said sectors used by said first operating system respective storage areas on a third sub-area of said mass storage device to be used as a first virtual hard disk by said first operating system;

performing a second boot process to run said hypervisor as a host operating system; and executing said first operating system as first guest operating system hosted by said hypervisor operating system.

19. The computer-readable medium of claim 18, wherein said process comprises:

allocating a second virtual disk;

installing software components of a second guest operating system; and activating said second guest operating system as a process using said second virtual disk as its system disk.

20. The computer-readable medium of claim 18, wherein said process comprises saving data relating to said first operating system to enable an uninstall operation at later stages before performing said first boot process.

* * * * *